US000001290H

United States Statutory Invention Registration [19]

[11] Reg. Number: H1290

[43] Published: Feb. 1, 1994

Mann et al.

[54] CONFORMABLE ACOUSTIC COUPLER

[75] Inventors: Noel R. Mann, Perkinston, Miss.; Irving F. Barditch, Baltimore City, Md.; Ronny Robbins, Edgewood, Md.

[73] Assignee: The United States of America as represented by the Secretary of the Army, Washington, D.C.

[21] Appl. No.: 8,234

[22] Filed: Jan. 25, 1993

Related U.S. Application Data

[63] Continuation of Ser. No. 935,698, Aug. 26, 1992, abandoned.

[51] Int. Cl.[5] ..... H04R 23/00

[52] U.S. Cl. ..... 367/140; 367/152; 310/336; 73/644

[56] References Cited

U.S. PATENT DOCUMENTS

| | | | |
|---|---|---|---|
| 3,595,069 | 7/1971 | Fowler | 73/67.2 |
| 4,188,830 | 2/1980 | Mason et al. | 73/801 |
| 4,365,516 | 12/1982 | Molina | 73/644 |
| 4,459,854 | 7/1984 | Richardson et al. | 128/662.03 |
| 4,867,169 | 9/1989 | Machida et al. | 128/662.03 |
| 4,962,752 | 10/1990 | Reichenberger et al. | 73/644 |
| 5,039,774 | 8/1991 | Shikinami et al. | 128/662.03 |
| 5,078,149 | 1/1992 | Katsumata et al. | 73/644 |

*Primary Examiner*—J. Woodraw Eldred

*Attorney, Agent, or Firm*—Anthony T. Lane; Edward Goldberg; Michael Sachs

[57] ABSTRACT

A conformable acoustic coupler for ultrasonically testing an article. The coupler has an ultrasonic transducer with an active surface which transmits ultrasonic energy pulses to an article to be tested. A sensor receives and measures an ultrasonic echo from the tested article. The article to be tested is acoustically mated to the active surface by a medium of a gelatinous material layer on the active surface and a flexible film on the gelatinous material layer. The combination of the gelatinous material and film conforms to the shape of the article and provide acoustic coupling between the active surface and the article without leaving a residue of the medium on the article.

24 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONFORMABLE ACOUSTIC COUPLER

GOVERNMENTAL INTEREST

The invention described herein may be manufactured, used and licensed by or for the Government for Governmental purposes without the payment to us of any royalties thereon.

This application is a continuation of application Ser. No. 07/935,698, filed Aug. 26, 1992, now abandoned.

BACKGROUND OF THE INVENTION

The present invention relates to ultrasonic testing and more particularly to conformable acoustic couplers for use in ultrasonic testing.

A requirement exists to verify the existing chemical weapons stockpile declarations. However, a large part of the existing stockpiles are contained within sealed munitions. Typically, chemical munitions can be differentiated from conventional munitions by external labeling. However, many of these munitions, particularly in third world countries, are not labeled. In addition, munitions might be improperly labeled to conceal their contents. Identification of the contents by conventional analytical methods would be dangerous and time consuming. Heretofore, no methods are currently available to quickly and safely identify the contents of sealed munitions. However, a number of existing technologies appear to be adaptable to the task with some additional modifications. Ultrasonic technology is attractive because it is inherently safe, straightforward in application, has the potential to be miniaturized and is available at low cost. It is known in the art to conduct nondestructive testing of unknown materials within containers and the like by means of ultrasonic test procedures. One of several possible approaches to ultrasonic interrogation is to measure the velocity of sound in the various chemical agents. In this regard, U.S. Pat. Nos. 2,527,986 and 2,398,701 pertain to such ultrasonic testing techniques. It is generally well known that sound travels through different materials at different speeds. In the case of chemical verification, a specific fill might be related to a specific velocity at a measured temperature. While different chemical agents can be correlated to specific transmission velocities under controlled conditions, it has been found that differentiation of munition fills on the basis of velocity measurements is not practical. One reason is that transmission velocities are highly dependent on temperature, which is easy to measure but difficult to control in the field. In addition, the physical condition and purity of the chemical fills is known to vary significantly, and the variations encountered in the measurement of transmission velocities does not allow for reasonable statistical correlations. Also, the speed of transmission is similar in a number of unrelated materials and is not sufficiently unique for the intended purpose of verification of chemical stockpiles. In addition, several other practical constraints beyond temperature and fill purity require attention. The physical condition of the fills and the internal structural configurations vary, sometimes significantly, in munitions of similar type. In the case of filled munitions, information on the internal structure or condition is often not known. As an example, the burster core within the center of the munition can be short, long or of some intermediate length. It may be empty, packed with explosives, or filled with small explosive canisters. It is apparent that this high degree of variability among like munitions must be taken into consideration. Another approach to ultrasonic interrogation is the standing wave or resonance approach. In this regard see U.S. Pat. Nos. 4,215,583 and 3,861,200. Variations of resonant ultrasound have been used to test for structural integrity or homogeneity of various materials. In this method a structure is stimulated to induce one or more resonant frequencies and the frequency is compared with a reference spectrum for similarity. In the case of the present invention, the munitions would serve as the test structure and behave as an integral system. For a discussion of this method, one may see U.S. Pat. No. 3,595,069 and Postany, G.J., *Influence of the Pulser on the Ultrasonic Spectrum: The Results of an Experiment*"; Materials Evaluation, Mar. 1965, pgs. 417–419. When stimulated with broadband excitation, those materials with a higher resonance transmission will tend to dominate the frequency spectrum. In the testing of munitions, frequency transmission is favored by the shell or container casing as opposed to the fill. Similar shells or containers would tend to resonate in a similar manner, and the damping effects of the fill would become a secondary resonance effect. Different fills would have different damping factors, and thus can be differentiated. This approach is highly desirable for structural analysis of the munitions, but less so for determination of the contents of the fill because the fill level is observed to have a large effect on the frequency signature. In addition, the method in which the munition is supported and the position of the transducer both have an observable and sometimes unpredictable effect on the frequency signature. Such changes in the frequency signature make correlations with stored spectra difficult.

A third method of ultrasonic interrogation, the pulse-echo method appears to be somewhat more forgiving in subtle variations found in the resonance methods. One may see U.S. Pat. No. 3,595,069 and Kline, R.A. *Measurement of Attenuation and Dispersion Using an Ultrasonic Spectroscopy Technique*". J. Acoust. Soc. Am. 76(2), Aug. 1985, pgs 498–504, both of which are incorporated herein by references.

By this means, an acoustic transducer generates an acoustic pulse through an active surface which is thereby imparted to an article to be tested. The pulsed article produces a reverberation which is received by a sensor, usually a piezoelectric device. The sensor then produces a signal which is measured by an analysis device such as a computer. While such ultrasonic testing is very frequently used in articles having substantially flat surfaces, it has been a problem in the art to ultrasonically test curved surfaces. This is because it has been difficult to achieve a good acoustic energy coupling between the active surface of the transducer and the curved article to be tested. It is known in the art that when performing ultrasonic testing, close coupling should be attained between the active surface of a transducer and the article to be tested. Acoustic coupling to non-flat surfaces such as ammunition shells, storage tanks, etc., require coupling that easily conforms to its surface. One attempt at solving this problem has been to use an aqueous interface or grease as a coupling medium between the active surface and the article to be tested. In another attempt, plastic materials such as putty or modeling clay have been used. These have proved to be unsatisfactory since such materials leave residues which may be corrosive or absorb chemical agents. A method of close coupling by applying a fluid coupling layer is suggested by Pedrix, M., et al, *Acoustic Independence Measurement by Reflection of Ultrasonic Impulse on a Specimen through a Coupling Layer*", Transactions on Sonics and Ultrasonics, Vol. SU-28, No. 6, Nov. 1981. Coupling fluids are a problem when testing munitions since they tend to leave a residue and react with or absorb into the shell container.

For ease of operation and speed in testing a large variety of sizes and types of articles, a material is needed which does not leave a residue on the article to be tested. It also must be capable of functioning over a wide temperature range while being non-reactive, non-absorbing and not require subsequent cleaning of the tested article.

It is therefore an object of the invention to provide a conformable acoustic coupler for ultrasonically testing an article which quickly and easily conforms to a variety of non-flat surfaces and permits quick and efficient testing over a wide range of ambient conditions. Another object of the invention is to provide such a conformable acoustic coupler which does not leave a residue on the article which must be removed and where the coupler is non-reactive with the article.

These and other objects will be in part described and in part apparent from a consideration of the detailed description of the preferred embodiment.

SUMMARY OF THE INVENTION

The invention provides a conformable acoustic coupler for ultrasonically testing an article. The coupler includes an ultrasonic transducer having an active surface, which surface is capable of transmitting an ultrasonic energy pulse therethrough, said transducer comprising ultrasonic pulse generating means capable of applying an ultrasonic energy pulse by said active surface to an article; and ultrasonic sensor means capable of receiving and measuring an ultrasonic echo from said article in response to said applied ultrasonic energy pulse; and means for acoustically mating said article to the active surface of said transducer, said acoustic mating means comprising a layer of a gelatinous material on said active surface and a flexible film on said gelatinous material layer, which film substantially does not react with and substantially does not absorb said gelatinous material; wherein said acoustic mating means is capable of conforming to the shape of at least part of said article.

The invention also provides a method for ultrasonically testing an article. The method includes the steps of providing an acoustic coupler, said acoustic coupler comprising an ultrasonic transducer having an active surface, which surface is capable of transmitting an ultrasonic energy pulse therethrough, said transducer comprising ultrasonic pulse generating means capable of applying an ultrasonic energy pulse by said active surface to an article; and ultrasonic sensor means capable of receiving and measuring an ultrasonic echo produced by said article in response to said applied ultrasonic energy pulse; and means for acoustically mating said article to the active surface of said transducer, said acoustic mating means comprising a layer of a gelatinous material on said active surface and a flexible film on said gelatinous material layer, which film substantially does not react with and substantially does not absorb said gelatinous material; wherein said acoustic mating means is capable of conforming to the shape of at least part of said article; and juxtapositioning an article to be tested with said acoustic mating means such that said acoustic mating means conforms to the shape of at least part of said article; and applying an ultrasonic energy pulse to said article through said active surface and said acoustic mating means; and receiving and measuring the ultrasonic echo produced by said article in response to said applied ultrasonic energy pulse.

The invention further provides a method for ultrasonically testing a munitions article. The method includes the steps of providing an acoustic coupler, said acoustic coupler comprising an ultrasonic transducer having an active surface, which surface is capable of transmitting an ultrasonic energy pulse therethrough, said transducer comprising ultrasonic pulse generating means capable of applying an ultrasonic energy pulse by said active surface to a munitions article; and ultrasonic sensor means capable of receiving and measuring an ultrasonic echo produced by said munitions article in response to said applied ultrasonic energy pulse; and means for acoustically mating said munitions article to the active surface of said transducer, said acoustic mating means comprising a layer of a gelatinous material on said active surface and a flexible film on said gelatinous material layer, which film substantially does not react with and substantially does not absorb said gelatinous material; wherein said acoustic mating means is capable of conforming to the shape of at least part of said munitions article; and juxtapositioning a munitions article to be tested with said acoustic mating means such that said acoustic mating means conforms to the shape of at least part of said munitions article; and applying an ultrasonic energy pulse to said munitions article through said active surface and said acoustic mating means; and receiving and measuring the ultrasonic echo produced by said munitions article in response to said applied ultrasonic energy pulse.

DETAILED DESCRIPTION OF THE PREFERRED EMBODIMENT

Figure 1:
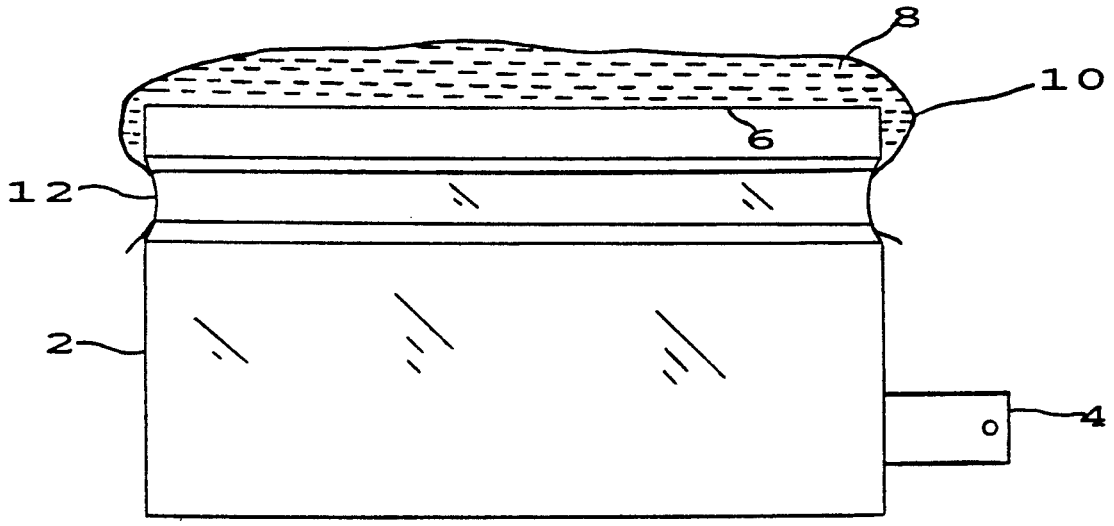
FIG. 1 is a schematic representation of an embodiment of the conformable acoustic coupler for ultrasonically testing according to the invention.

In the practice of the present invention, an acoustic transducer generates an acoustic pulse through an active surface which is thereby imparted to an article to be tested. The pulsed article produces a reverberation which is received by a sensor which is a piezoelectric crystal, and preferably the same device which generated the pulse. The sensor then produces a signal which is measured by an analysis device such as a spectrum analyzer and computer. In this approach, a broadband frequency is pulsed through a munitions article. As the pulse echoes back and forth between the walls of the munitions and through the fill, certain frequencies are attenuated more than others. The attenuation would be dependent primarily upon the composition of the fill and to a lesser degree on the geometry and composition of the shell or container. Since a single pulse is used to create the spectrum, a Fourier transformation is the ideal treatment to reconstruct the spectral fingerprint. The broadband fingerprint would also be more suitable for statistical correlations used in pattern matching algorithms since it is primarily formed by the attenuating effects of the fill rather than the secondary effects of damping on the resonance of the structure.

The preferred embodiment of the invention may be seen with reference to drawing FIG. 1. The testing device comprises a piezoelectric transducer 2, such as a Panametrics 100 kHz commercially available as a Panametrics High Voltage Pulser model 5058 which comprises a piezoelectric crystal. The transducer has a BNC connector 4, which connects the transducer to the pulser and data collection means which is preferably a Hewlett Packard Spectrum Analyzer model 3567A for acquiring a frequency spectrum from 0 to 104 kHz and an industrial grade IBM PC compatible computer for data collection, storage and comparison. The transducer has an active surface 6 through which the ultrasonic pulses and echoes are transmitted to and acquired from the article to be tested. Applied to the active surface of the transducer is a medium for closely coupling the transducer to the shape of the article to be tested. The medium comprises a layer of a gelatinous material 8, such as petroleum jelly, silicone grease, water based jellies such as K-Y Jelly available from Johnson & Johnson, and food gels such as Jell-O and honey. Putties and clays can also be used, however, these are less preferred. In the preferred embodiment the gelatinous material layer has a thickness of from about 0.125 to about 0.25 inch. This gelatinous material establishes good acoustic contact with the active surface of the transducer. Encircling the gelatinous material is a thin film 10 which serves to separate the gelatinous material from direct contact with the article to be tested. However, it is thin enough that it establishes good acoustic contact with the gelatinous material, and hence the active surface of the transducer and also conforms to the shape of the article to be tested while also establishing good acoustic contact with the article. In the preferred embodiment, the flexible film comprises a material such as polyvinylidene chloride, commercially available as saran wrap, polyvinylidene fluoride, commercially available as Tedar, polyethylene, and polyethylene terephthalate. The film preferably has a thickness of from about 0.5 to about 1.0 mil. The thin film can be held to the transducer by a retaining belt 12 which can be a metal or rubber band. For testing, one merely places the article to be tested on the outer surface of the thin film. This configuration conforms to the surface of the article to be tested and gives excellent acoustic coupling of the article to the transducer. This also allows rapid movement from article to article during testing with no need to clean the article of gelatinous material after testing.

The following non-limiting examples serve to illustrate the invention.

EXAMPLE 1

A munitions shell is subjected to a single half wave electrical pulse through a single piezoelectric crystal transducer. The transducer serves as the signal source as well as the receiver of a pulse-echo. A commercially available Panametrics High Voltage Pulser model 5058 with a Panametrics 100 kHz transducer is used as the source of excitation. A Hewlett Packard Spectrum Analyzer model 3567A is used to acquire the frequency spectrum from 0 to 104 kHz. An industrial grade IBM PC compatible computer is used for data analysis and to acquire a frequency signature. The shell acts as a resonant cavity with a large number of complex resonant modes. When an impulse of energy is applied, a wide range of frequencies are present and decay rapidly. These various frequencies undergo different degrees of attenuation or resonance as well as phase modulation depending on the composition of the fill.

In the performance of a test, an operator positions and holds the transducer against the munition. In order to obtain enhanced coupling of the munition to the transducer, a thick film of K-Y Jelly, commercially available from Johnson and Johnson is applied to the active surface of the transducer. A film of saran wrap encircles the K-Y Jelly to separate it from the munition to be tested. A pulse signal is applied to the munition, pulse echo data is collected and the operator can either save the data and compare the data either manually or automatically to a library reference spectra, an average spectra or to the data from any other munition. Data is collected as a power spectrum over the frequency range 0 to 104 kHz where each power spectrum represents an average of ten (10) individual spectra.

EXAMPLE 2

Two 155 mm shells are filled wit air, water, ethylene glycol, sand and several aqueous suspensions, and then tested with the apparatus described in Example 1. In all cases, each material gives a distinctive spectrum and identification of the contents is easily accomplished. In addition, fine degrees of distinction can often be made between similar materials. The signature of a solid suspension can be differentiated from its unsuspended counterpart.

EXAMPLE 3

A series of 8 inch conventional HE (TNT) rounds, 155 mm conventional Comp B rounds, 155 mm VX rounds, 105 m GB rounds, 155 mm GB rounds and 1 ton HD containers are tested using the apparatus described in Example 1 and frequency signatures obtained. It is observed that variations in temperature have little effect on the frequency spectrum unless a phase change occurs over the measured range. In addition, it is found that the frequency spectrum is not affected by the general position of the transducer, except when the transducer is placed at either extreme end of the munition or above the fill line. It is further observed that the fill level does not have an appreciable effect on the frequency signature except when the container is almost empty. It is found that one can establish the similarity and identity of contents of sealed containers on the basis of similarities of the reconstructed spectral signatures.

These tests demonstrate that it is possible to rapidly field check a large number of sealed munitions in a non-intrusive and non-destructive manner. Analysis indicates a high correlation between similar rounds and rather low correlations between different chemical agents.

What is claimed is:

1. A conformable acoustic coupler for ultrasonically testing an article, said coupler comprising:

a) an ultrasonic transducer having an active surface, which surface is capable of transmitting an ultrasonic energy pulse therethrough, said transducer comprising ultrasonic pulse generating means capable of applying an ultrasonic energy pulse by said active surface to an article; and ultrasonic sensor means capable of receiving and measuring an ultrasonic echo from said article in response to said applied ultrasonic energy pulse; and b) means for acoustically mating said article to the active surface of said transducer, said acoustic mating means comprising a layer of a gelatinous material on said active surface and a flexible film on said gelatinous material layer, which film substantially does not react with and substantially does not absorb said gelatinous material; wherein said acoustic mating means is capable of conforming to the shape of at least part said article.

2. The coupler of claim 1 wherein said flexible film comprises a material selected from the group consisting of polyvinylidene chloride, polyvinylidene fluoride, polyethylene, and polyethylene terephthalate.

3. The coupler of claim 1 wherein said flexible film has a thickness of from about 0.5 to about 1.0 mil.

4. The coupler of claim 1 wherein said gelatinous material layer comprises a material selected from the group consisting of petroleum jelly, silicone grease, water based jellies and food gels.

5. The coupler of claim 1 wherein said gelatinous material layer has a thickness of from about 0.125 to about 0.25 inch.

6. The coupler of claim 1 wherein said transducer comprises a piezoelectric crystal.

7. The coupler of claim 1 wherein said transducer generates an ultrasonic energy pulse having a frequency in the range of more than 0 to about 104 kHz.

8. A method for ultrasonically testing an article comprising the steps of:

i) providing an acoustic coupler, said acoustic coupler comprising:

a) an ultrasonic transducer having an active surface, which surface is capable of transmitting an ultrasonic energy pulse therethrough, said transducer comprising ultrasonic pulse generating means capable of applying an ultrasonic energy pulse by said active surface to an article; and ultrasonic sensor means capable of receiving and measuring an ultrasonic echo produced by said article in response to said applied ultrasonic energy pulse; and b) means for acoustically mating said article to the active surface of said transducer, said acoustic mating means comprising a layer of a gelatinous material on said active surface and a flexible film on said gelatinous material layer, which film substantially does not react with and substantially does not absorb said gelatinous material; wherein said acoustic mating means is capable of conforming to the shape of at least part said article; and ii) juxtapositioning an article to be tested with said acoustic mating means such that said acoustic mating means conforms to the shape of at least part of said article; and iii) applying an ultrasonic energy pulse to said article through said active surface and said acoustic mating means; and iv) receiving and measuring the ultrasonic echo produced by said article in response to said applied ultrasonic energy pulse.

9. The method of claim 8 wherein said flexible film comprises a material selected from the group consisting of polyvinylidene chloride, polyvinylidene fluoride, polyethylene, and polyethylene terephthalate.

10. The method of claim 8 wherein said flexible film has a thickness of from about 0.5 to about 1.0 mil.

11. The method of claim 8 wherein said gelatinous material layer comprises a material selected from the group consisting of petroleum jelly, silicone grease, water based jellies and food gels.

12. The method of claim 8 wherein said gelatinous material layer has a thickness of from about 0.125 to about 0.25 inch.

13. The method of claim 8 wherein said transducer comprises a piezoelectric crystal.

14. The method of claim 10 wherein said transducer generates an ultrasonic energy pulse has a frequency in the range of more than 0 to about 104 kHz.

15. A method for ultrasonically testing a munitions article comprising the steps of:

i) providing an acoustic coupler, said acoustic coupler comprising:

a) an ultrasonic transducer having an active surface, which surface is capable of transmitting an ultrasonic energy pulse therethrough, said transducer comprising ultrasonic pulse generating means capable of applying an ultrasonic energy pulse by said active surface to a munitions article; and ultrasonic sensor means capable of receiving and measuring an ultrasonic echo produced by said munitions article in response to said applied ultrasonic energy pulse; and b) means for acoustically mating said munitions article to the active surface of said transducer, said acoustic mating means comprising a layer of a gelatinous material on said active surface and a flexible film on said gelatinous material layer, which film substantially does not react with and substantially does not absorb said gelatinous material; wherein said acoustic mating means is capable of conforming to the shape of at least part said munitions article; and ii) juxtapositioning a munitions article to be tested with said acoustic mating means such that said acoustic mating means conforms to the shape of at least part of said munitions article; and iii) applying an ultrasonic energy pulse to said munitions article through said active surface and said acoustic mating means; and iv) receiving and measuring the ultrasonic echo produced by said munitions article in response to said applied ultrasonic energy pulse.

16. The method of claim 15 wherein said flexible film comprises a material selected from the group consisting of polyvinylidene chloride, polyvinylidene fluoride, polyethylene, and polyethylene terephthalate.

17. The method of claim 15 wherein said flexible film has a thickness of from about 0.5 to about 1.0 mil.

18. The method of claim 15 wherein said gelatinous material layer comprises a material selected from the group consisting of petroleum jelly, silicone grease, water based jellies and food gels.

19. The method of claim 15 wherein said gelatinous material layer has a thickness of from about 0.125 to about 0.25 inch.

20. The method of claim 15 wherein said transducer comprises a piezoelectric crystal.

21. The method of claim 15 wherein said transducer generates an ultrasonic energy pulse having a frequency in the range of more than 0 to about 104 kHz.

22. The method of claim 15 wherein said munitions article comprises an artillery shell.

23. The method of claim 15 wherein said munitions article comprises a chemical warfare agent.

24. The method of claim 22 wherein said munitions article comprises a chemical warfare agent.

* * * * *